INVENTOR.
THOMAS E. O'CONNOR
BY Herbert L. Davis
ATTORNEY

March 31, 1970 T. E. O'CONNOR 3,503,269
MEANS FOR SUPPORTING A ROTOR OF A SINGLE
DEGREE OF FREEDOM GYROSCOPE
Filed Jan. 26, 1967 3 Sheets-Sheet 2

INVENTOR.
THOMAS E. O'CONNOR
BY
*Herbert L. Davis*

ATTORNEY

March 31, 1970  T. E. O'CONNOR  3,503,269
MEANS FOR SUPPORTING A ROTOR OF A SINGLE
DEGREE OF FREEDOM GYROSCOPE Filed Jan. 26, 1967  3 Sheets-Sheet 3

INVENTOR.
THOMAS E. O'CONNOR
BY
ATTORNEY

United States Patent Office 3,503,269
Patented Mar. 31, 1970

3,503,269
MEANS FOR SUPPORTING A ROTOR OF A SINGLE DEGREE OF FREEDOM GYROSCOPE
Thomas E. O'Connor, Hawthorne, N.J., assignor to The Bendix Corporation, a corporation of Delaware
Filed Jan. 26, 1967, Ser. No. 611,882
Int. Cl. G01c 19/16
U.S. Cl. 74—5.43                                    14 Claims

ABSTRACT OF THE DISCLOSURE

A single degree of freedom gyroscope having a rotor rotating on a fixed member. The rotor and member have opposing spherical portions forming a fluid pressure bearing therebetween. The rotor has an annular groove in the spherical portion receiving torque elements on the fixed member to enable the rotor to rotate about a first axis and move angularly about a second axis and to restrain movement about a third axis mutually perpendicular to the first and second axes.

FIELD OF THE INVENTION

This invention provides a single degree of freedom gyroscope having an air supported rotor.

PRIOR ART

Heretofore air bearing gyroscopes such as shown in U.S. Patent No. 2,729,106, granted Jan. 3, 1956, to J. C. Mathiesen, have been designed to eliminate output axis bearings since the bearings and supporting gimbal structures limit the size of the wheel and complicate accurate and immediate response because of bearing friction. It is not desirable to limit the size of the wheel since gyroscope accuracy is proportional to the wheel angular moment of inertia, which in turn is a rapid function of the wheel radius. The gyroscope with an air bearing such as shown in the Mathiesen patent has the rotor mounted for multiple degree of freedom of rotation. The present invention provides such a gimballess gyroscope with an air supported rotor, but additionally provides means between a rotor and bearing structure to limit motion of the rotor to a single degree of freedom.

SUMMARY OF THE INVENTION

This invention contemplates limitation of precessional motion by a single spherical air bearing and rotor structure in a gyroscope to a single degree of freedom about the output axis of the gyroscope, while simultaneously limiting the single spherical air bearing and wheel structure so as to prevent relative motion of the rotor about the input axis of the gyroscope.

Another object of the invention is to provide an air bearing for a gyroscope to minimize (reduce) friction between rotor and support.

Another object of the invention is to provide a gyroscope with an air supported rotor limited to a single degree of freedom so as to eliminate the necessity of other bearings or gimbal rings.

Another object of the invention is to provide a gyroscope structure which combines the spin axis with the output axis in one bearing.

A further object of the invention is to provide a single degree of freedom gyroscope having a rotor internally supported.

A further object of the invention is to provide a single degree of freedom gyroscope having a rotor externally supported.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the several drawings in which corresponding numerals indicate like parts.

DESCRIPTION OF THE INVENTION

Figure 1:
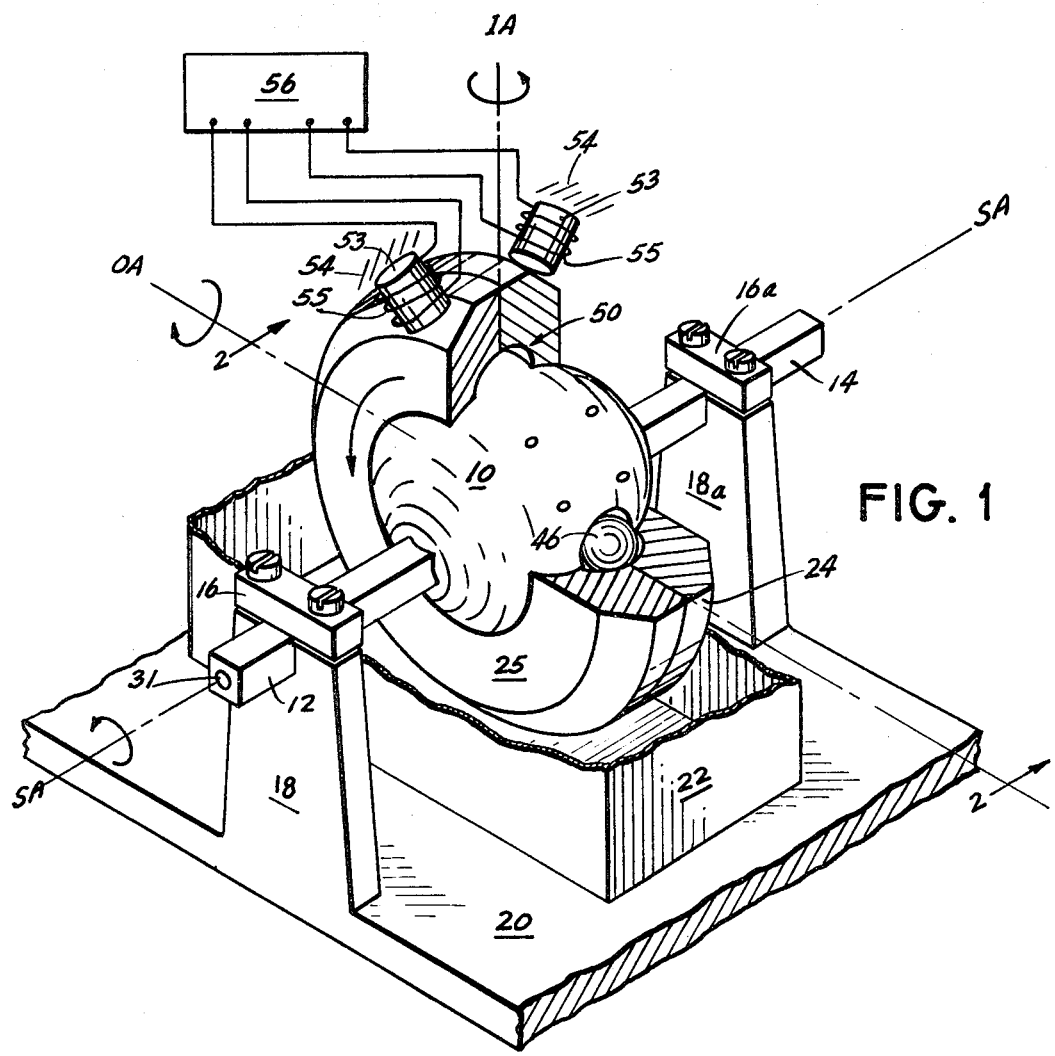
FIGURE 1 is a fragmentary perspective view of a single degree of freedom gyroscope embodying the invention.

Referring to FIGURE 1, a spherical air bearing 10 is fixedly attached to support shafts 12 and 14 which may be adjustably connected by means of locking adapters 16 and 16A to legs 18 and 18A of a platform structure 20 mounted on a moving vehicle, such as an outer space vehicle of a type well known in the art. A protective casing 22, shown in cutaway section, is rigidly attached to the platform structure 20 to protect the gyroscope from external air drafts and impurities. Axes SA, IA and OA represent the spin axis, the input axis and the output axis of the gyroscope respectively. The spherical air bearing 10, hereinafter designated bearing 10, is shown supporting a circumferentially surrounding rotor 25 having ferro magnetic material about a peripheral external surface 24 thereof to complete a magnetic circuit of a motor means of conventional type (not shown) which may be mounted within the casing 22 and arranged for driving the rotor 25 by an electromagnetic field generated by said motor means about the rotor 25.

Figures 2, 3:
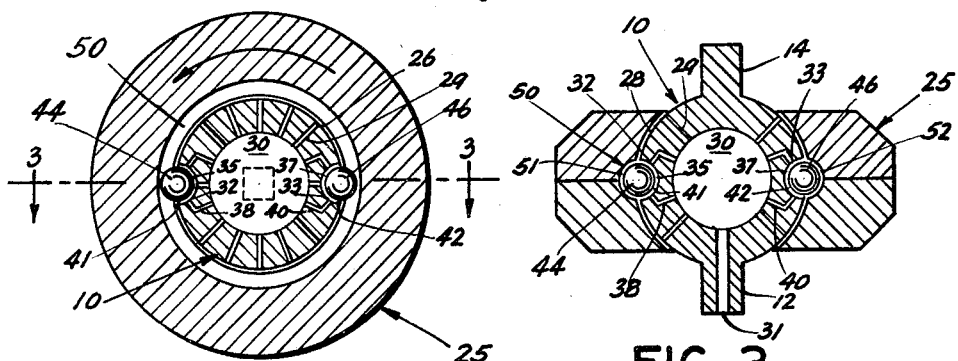
FIGURE 2 is a cross-sectional view of FIGURE 1 taken along the lines 2—2 and looking in the direction of the arrows.
FIGURE 3 is a cross-sectional view of FIGURE 2 taken along the lines 3—3 and looking in the direction of the arrows.

As shown in FIGURES 1, 2 and 3, air jet ports 26 are provided on an external surface of the bearing 10. There is further provided an air film space 28 between the external surface of the bearing 10 and an internal surface of the rotor 25 which space 28 is connected by the jet ports 26 through conduits 29 to an inner hollow 30 of the bearing 10 so as to allow air under pressure supplied through a passageway 31 to the hollow 30 to be transmitted to air film space 28. The passageway 31 may be formed in the support shaft 12 and leads from a suitable source of super atmospheric pressure. Air jet ports 32 and 33 open into concave bearing sockets 35 and 37 formed in the spherical air bearing 10 and these air jet ports 32 and 33 are connected to conduits 38 and 40, respectively, which lead to the hollow 30 so as to provide air under pressure from the hollow 30 to be transmitted to air film spaces 41 and 42 between surfaces of the bearing sockets 35 and 37 and the surfaces of torque balls 44 and 46, respectively, positioned in said sockets. Passageway 31 bored in shaft 12 provides an input from an external fluid pressure source (not shown) to the hollow 30 within bearing 10.

Spherical torque balls 44 and 46 shown mounted in sockets 35 and 37 are diametrically opposed in the bearing 10 along output axis OA so as to prevent motion of the rotor 25 with respect to bearing 10 about input axis IA. The radii of the torque balls 44 and 46 are slightly less than the radii of the semicircular concave sockets 35 and 37 thereby defining the air film space 41 between torque ball 44 and socket 35 and air film space 42 between torque ball 46 and socket 37.

An annular groove 50 having a concave semicircular cross section is formed or cut about the inner surface of the rotor 25. The annular groove 50 is concentric with relation to the center of rotation or spin axis SA of the rotor 25. The radii of the torque balls 44 and 46 are slightly less than the radii of the semicircular cross section of the groove 50 thereby defining air film space 51, 52 between torque balls 44, 46 and groove 50.

A pair of conventional magnetic pole piece pickoffs 53 may be utilized as a suitable angle transducer. The pole pieces of the pickoffs 53 may be affixed at 54 to an inner surface of the casing 22 which in turn is mounted on the platform structure 20 and positioned adjacent to the rotor 25, as shown in FIGURE 1. Wound about the pole pieces 53 are the electromagnetic windings 55 to sense the angular position or motion of the rotor 25 about output axis OA. The windings 55 are in turn connected into a suitable control network 56 operated thereby in a conventional manner.

Figure 4:
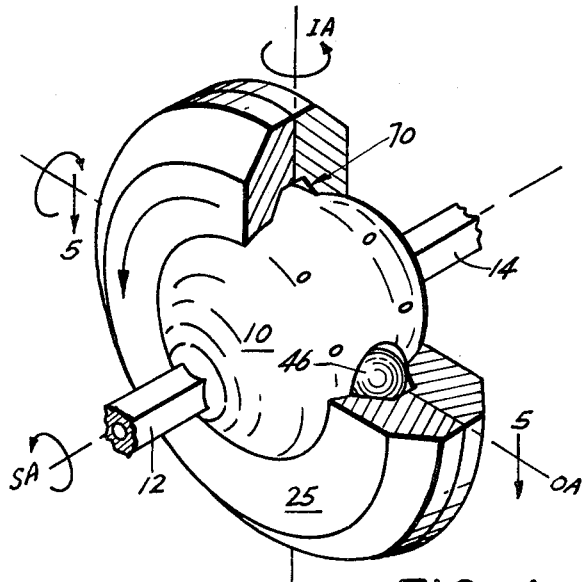
FIGURE 4 is a fragmentary perspective view of another form of the rotor for a single degree of freedom gyroscope such as shown by FIGURE 1 and embodying the invention.
Figure 5:
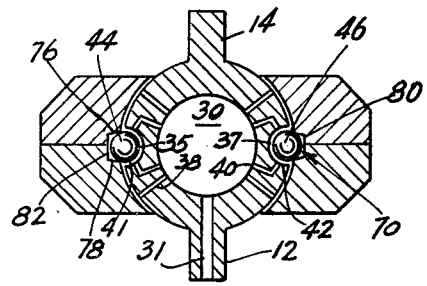
FIGURE 5 is a cross-sectional view of FIGURE 4 taken along the line 5—5 and looking in the direction of the arrrows.

Referring to FIGURES 4 and 5, a modified form of the rotor structure of FIGURE 1 is shown similar in structure thereto in that a spherical air bearing 10 supports a rotor 25 mounting thereon, but instead of the semicircular groove 50 of FIGURE 1, there is provided in the rotor structure of the form of the invention of FIGURE 4, an annular groove 70 having a three sided truncated trapezoidal cross section. The annular groove 70 is cut or formed about the inner surface of the rotor 25 and is arranged in concentric relation to the center of rotation or spin axis SA of the rotor 25. Furthermore torque balls 44 and 46 fit into and may rotate within the truncated groove 70 in a contacting relation with opposing sides 76 and 78 of the groove 70 and defining thereby an air space 80 between a third side 82 of groove 70 and torque balls 44 and 46. The sides 76 and 78 of the groove 70 are coated with a ceramic or similar hard material.

Figure 6:
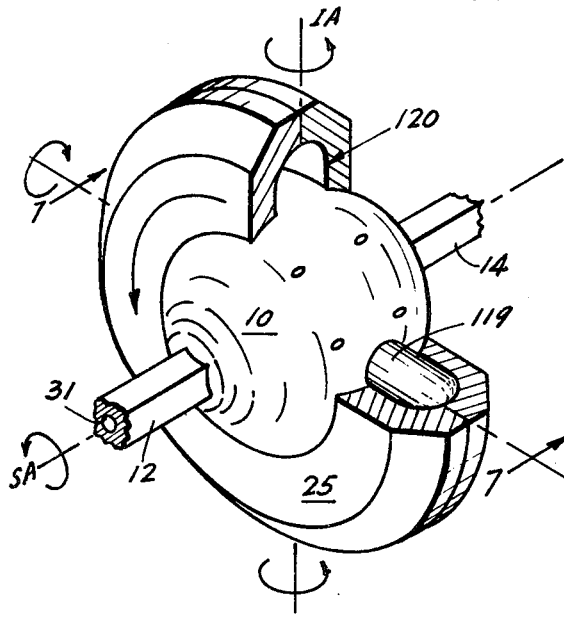
FIGURE 6 is a fragmentary perspective view of another form of a rotor for a single degree of freedom gyroscope such as shown by FIGURE 1 and embodying the invention.

Referring to FIGURE 6, another form of rotor structure embodying the invention is shown having axes SA, IA and OA again representing spin axis, input axis and output axis, respectively. The spherical air bearing 10 supporting gyro rotor 25 of the form of the invention of FIGURE 6, instead of the torque balls 44 and 46 of FIGURES 1–5, has torque arms 117 and 119 rigidly attached to the bearing 10 in diametrically opposite relation and extending along the output axis OA so as to prevent motion of the rotor 25 with respect to bearing 10 about the input axis IA.

Figure 7:
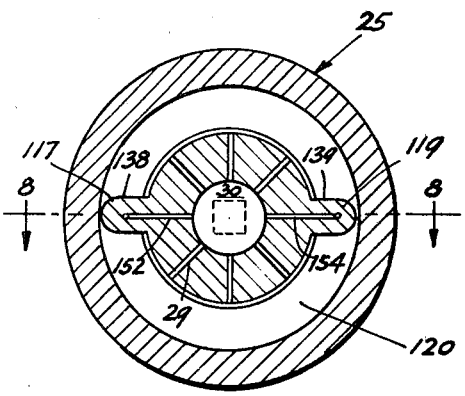
FIGURE 7 is a cross-sectional view of FIGURE 6 taken along the line 7—7 and looking in the direction of the arrows.
Figure 8:
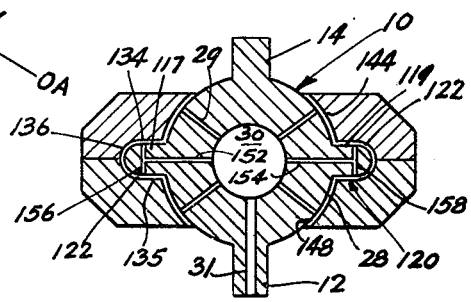
FIGURE 8 is a cross-sectional view of FIGURE 7 taken along the line 8—8 and looking in the direction of the arrows.

Referring in particular to FIGURES 7 and 8, a groove 120 is provided about the inner surface of the rotor 25 in a concentric relation with the spin axis SA of the rotor 25. The groove 120 is so dimensioned that an air film space 122 exists between the groove faces 134, 135 and 136 and cylindrical arm surfaces 138 and 139 of the torque arms 117 and 119.

The conduits 29 from the external surface of the bearing 10 connect the air film space 28 to the inner hollow 30 of bearing 10 defined by the inner spherical surface of bearing 10. Further leading from the hollow 30 within the bearing 10 are conduits 152 and 154 which lead to the respective torque arms 117 and 119 while conduits 156 and 158 branch from conduits 152 and 154 to the torque arm surfaces 138 and 139 of the torque arms 117 and 119, as shown by FIGURE 8, so as to allow air under pressure to be transmitted from hollow 30 to the air film space 122.

Suitable pickoffs similar to the pickoffs 53 of FIGURE 1 may be mounted so as to detect precessional motion of the rotor 25 about output axis OA.

Figure 9:
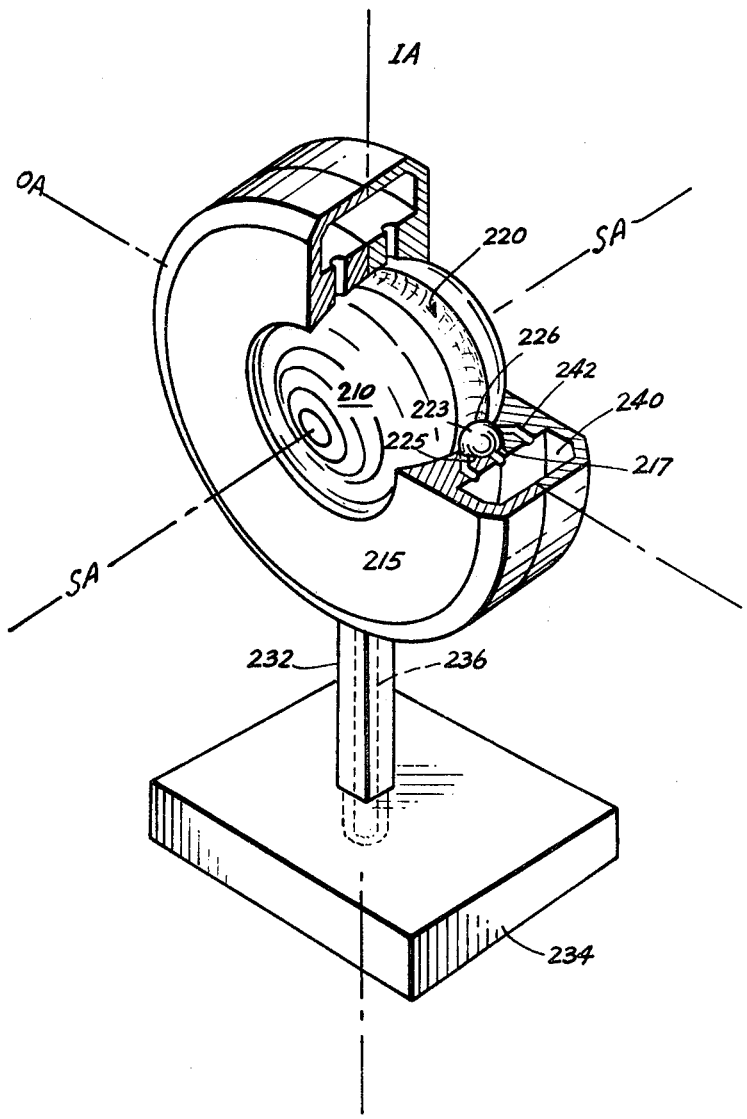
FIGURE 9 is a fragmentary perspective view of another form of single degree of freedom gyroscope embodying the invention.

Referring to FIGURE 9, an inverse arrangement to that of FIGURE 1 is shown wherein a rotor 210 is supported by an encompassing stationary air bearing 215 having diametrically opposed torque ball sockets 217 positioned along the output axis OA. A semicircular groove 220 is cut or formed about the spin axis SA so as to allow rotation of the rotor 210 about spin axis SA. There are further provided torque balls 223 which have a radius slightly less than the radius of the respective sockets 217, and a radius slightly less than the radius of the semicircular groove 220 thereby defining an air film space 225 between the torque balls 223 and the sockets 217 as well as an air film space 226 between the torque balls 223 and the inner surface of groove 220. The torque balls 223 fit into the diametrically opposed sockets 217 and are simultaneously positioned in the semicircular groove 220 in the rotor 210 along the output axis OA.

Further, the stationary air bearing 215 is supported by a post 232 carried by a platform structure 234. A passage 236 extends through the post 232 from a suitable source of superatmospheric pressure to an annular pressure chamber 240 from which lead conduits 242 to air jet ports opening into the air film space 225 of FIGURE 9.

The aforedescribed structure is the inverse of the structure of FIGURE 1 in that the rotating member rotor 210 is now within the stationary air bearing 215 as contrasted with the structure of FIGURE 1 wherein the rotating member, rotor 25, encompasses the external periphery of the stationary support member, air bearing 10.

The rotor 210 may have ferro magnetic material about a peripheral surface thereof to complete a magnetic surface of a motor means of conventional type (not shown) which may be mounted within the bearing 215 and arranged for driving the rotor 210 about the axis SA by an electromagnetic field generated by said motor means about the rotor 210. Electrical pickoff means (not shown) is also provided in the bearing 215 similar to the pickoff means 53 of FIGURE 1 and arranged to sense the angular position or motion of the rotor 210 about output axis OA in a conventional manner.

Similarly, it is within the contemplation of this invention to employ a groove in a rotor wherein the rotor is located within a spherical encompassing air support bearing, the groove being three-sided in shape and concentric with the spin axis. It should be seen that such a three-sided groove is the inverse analog of FIGURE 4 and is not shown in the application since the circular groove, as shown in FIGURE 9, sufficiently displays the arrangement, the modification being only as to the shape of the groove in the rotor 210 which has been described with reference to FIGURE 4.

Further, it is within the contemplation of this invention to employ a groove in a rotor wherein the rotor is located within a spherical encompassing air support bearing, the groove being concentric with the spin axis and being shaped so as to receive torque arms extending from an encompassing air support bearing. Such arrangement is the inverse analog of FIGURE 6 and is not shown in the application since the circular groove, as shown in FIGURE 9, sufficiently displays the arrangement, the modification being only as to the shape of the groove in the rotor 210, and torque arms extending therein, both of which have been described with reference to FIGURE 6.

OPERATION

In operation, the gyroscope wheel 25 of FIGURE 1 may be driven about spin axis SA by air jets or by an electromagnetic field located inside or outside the spherical bearing 10. The support shafts 12 and 14 are fixed to the stabilized platform structure 20 and passageway 31 in shaft 12 is used to supply air to the inner hollow 30 within the spherical air bearing 10.

The bearing 10 provides rotational freedom about the spin axis SA and the output axes OA and means of transmitting torque from the stabilized platform structure 20 is provided by a ball-socket-groove arrangement consisting of torque balls 44 and 46, concave semicircular bearing sockets 35 and 37 and semicircular groove 50 in the rotor 25. Air or gas is forced from the hollow 30 through conduits 38 and 40 to sockets 35 and 37 defining air films 41 and 42 to force the torque balls 44 and 46 into the groove 50. The air films 41 and 42 in combination with the flow of the air from hollow 30 through conduits 29 to the spherical bearing surface forming the air film 28 between the outer male surface of bearing 10 and the inner female surface of gyro rotor 25 totally support the rotor 25 thus reducing contact friction losses of mechanical bearings since no physical contact exists between bearing 10 and rotor 25. As the rotor 25 spins about the spin axis SA, the torque balls 44 and 46 rotate within the groove 50 relative to the rotor 25 but are held fixed along output axis OA with respect to the air support bearing 10 by the sockets 35 and 37.

External torques are transmitted from the stabilized platform 20 through the support structure 18 and 18A of shafts 12 and 14 and bearing 10 through the high pressure ball-socket air film spaces 41 and 42 to the torque balls 44 and 46, through the high pressure ball-groove hydrodynamic air film spaces 51 and 52 and hence to the rotor 25.

The rotor 25 precesses on the spherical air bearing 10 about the output axis OA since the torque balls 44 and 46 do not interfere with this motion since they are free to pivot in sockets 35 and 37 about this axis.

Precessional motion of the rotor 25 is detected by pickoff windings 55 of a suitable angle transducer such as shown for example in a U.S. Patent No. 3,107,540 granted Oct. 22, 1963, to L. E. Curriston. The pickoff windings 55 and the casing 22 are suitably mounted to the platform structure 20. The wheel 25 having a magnetic material about the periphery thereof varies the reluctance of the magnetic circuit created by pickoff windings 55 and the signal is charted against output axis angular displacement to provide accurate measuring of the latter.

Further, the torque balls 44 and 46 rotate in the same direction as the rotor 25 about the axis SA. For example, if the rotor 25 is driven counterclockwise as shown by the arrow on the rotor 25 in FIGURE 1, the balls 44 and 46 which are initially in contact with the groove 50 due to the high pressure air films 41 and 42, likewise rotate in a counterclockwise direction. The torque balls 44 and 46 rotate at much higher angular speeds than the rotor 25. Such design is advantageous since at high speeds this results in the aforementioned hydrodynamic pressure air film 51 and 52 which is built up between the torque balls 44 and 46 and the groove 50 to in effect lift the torque balls away from contact with the groove 50. As the rotor 25 comes up to speed, a force balance will eventually be achieved between the hydrostatic forces from the air pressure in the sockets 35 and 37 and the hydrodynamic forces between the torque balls 44 and 46 and the groove 50.

Referring to the second form of the rotor structure, as shown in FIGURES 4 and 5, upon the rotor 25 being driven by air jets or a suitable electromagnetic field produced by electrical energization of stator windings inside or outside the spherical bearing 10, the torque balls 44 and 46 are hydrostatically forced into and held in contact with the sides 76 and 78 of the groove 70 in the rotor 25 by the action of the pressurized gas or air flow through the conduits 38 leading from the hollow 30 to the concave sockets 35 and 37 in the bearing 10. The torque balls 44 and 46 rotate at a higher angular velocity than the angular velocity of the rotor 25. A hydrodynamic pressure is built up in air film spaces 41 and 42 between torque balls 44, 46 and sockets 35, 37 which effectively aids the hydrostatic air pressure created by the flow of the fluid pressure medium to force the torque balls 44 and 46 into the groove 70. The torque balls 44 and 46 are thus maintained in the groove 70 in rotational motion with respect to rotor 25, but in fixed position along output axis OA relative to the air support bearing 10.

External torques applied to the gyroscope of FIGURE 4 are transmitted from a stabilized platform (not shown but similar to platform 20 of FIGURE 1) to the support shafts 12 and 14 of bearing 10 through the ball-socket air films 41 and 42 to the torque balls 44 and 46 and hence to the rotor 25. The torque ball 44 in groove 70 and socket 35 is located in diametrical opposition with torque ball 46 in groove 70 and socket 37 along output axis OA to allow precessional motion about the output axis OA while simultaneously prohibiting motion of rotor 25 about input axis IA.

In the operation of the form of the invention as shown in FIGURES 6, 7 and 8, the gyroscope rotor 25 is conventionally driven about the spin axis SA by air jets or by an electromagnetic field located inside or outside the spherical air bearing 10. Torque arms 117 and 119 are rigidly attached to the spherical bearing 10 in diametrical opposition to, along and coaxial with the output axis OA and extend into the groove 120 of rotor 25 so as to prohibit motion of the rotor 25 about the input axis IA.

Referring to FIGURES 7 and 8 in particular, air under pressure flowing through intake passage 31 in support shaft 12 to the hollow 30 within the bearing 10 flows through conduits 152 and 154 to the branch torque arm conduits 156 and 158 and to the torque arm surfaces 138 and 139, respectively, forming high pressure air film 122 between the torque arms 117, 119 and the groove 120 into which the torque arms 117 and 119 extend. Similarly, conduits 29 provided in the bearing 10 extend from the hollow interior 30 of air bearing 10 to outer surface portion 148 of the bearing 10 so as to allow the fluid pressure medium to be transmitted to air film space 28 between the male spherical surface portion of bearing 10 and the inner concave spherical surface portion 144 of rotor 25 to support the rotor 25 in operation. High pressure air film 122 existing between torque arms 117, 119 and the groove 120 and the air film 28 between spherical male bearing surface portion 148 and concave inner spherical female rotor portion 144 in combination totally support rotor 25 thereby prohibiting physical contact and lessening contact friction between rotor 25 and air bearing 10.

Precessional motion of the rotor 25 may take place only about the output axis OA. Motion of the rotor 25 about the input axis IA is prevented by the torque arms 117 and 119 which are rigidly attached to the bearing 10 along output axis OA. The torque from the platform structure (not shown) in FIGURE 6, but similar to the embodiment in FIGURE 1 such as platform 20, through support shafts 12 and 14 of bearing 10 is transmitted to the rotor 25 through the high pressure air film 122 built up between the groove 120 and the torque arms 117 and 119. The high pressure air film 122 generated hydrodynamically by the action of the high angular velocity rotor 25 with respect to fixed torque arms 117 and 119 along output axis OA aids in maintenance of the pressure generated hydrostatically by the fluid pressure medium from the branch conduits 156, 158 in the torque arms 117 and 119, respectively.

Referring to FIGURE 9, the rotor 210 is driven about its spin axis SA by an electromagnetic field which can be located outside of the rotor 210 and integral with the bearing 215. The torque balls 223, as in the operation of FIGURE 1, rotate concurrently with the rotor 210 within the sockets 217 in the same direction as the rotation of the rotor 210. The hydrostatic force from the air flowing to the sockets 217 is built up between the sockets 217 and torque balls 223 to thus force the balls away from the sockets 217 in operation. A hydrodynamic pressure is also formed in operation between the torque balls 223 and the groove 220 since the torque balls 223 rotate at a much higher angular velocity than the rotor 210 while being maintained in diametrical opposition along output axis OA in the sockets 217.

Precession of the rotor and motion of the rotor is limited to a single degree of freedom about the output axis OA, since movement of the rotor 210 about any other axis perpendicular to spin axis SA with relation to air bearing 215 is prohibited by the torque balls 223 being concurrently located for rotation in sockets 217 and groove 220.

While several embodiments of the invention have been illustrated and described, various changes in the form and relative arrangements of the parts, which will now appear to those skilled in the art may be made without departing from the scope of the invention.

What is claimed is:

1. In a single degree of freedom gyroscope of a type to sense attitude of a moving vehicle and including a platform mounted on said vehicle, a first member fixedly attached to the platform, a second member rotatably mounted in relation to the first member about a first axis, one of said members having a spherical portion positioned within the other of said members, and one of said members having a fluid pressure chamber and fluid pressure conduits leading from the fluid pressure chamber and opening at a surface of the spherical portion so as to provide a fluid pressure bearing for the other member, wherein the improvement comprises:
   a pair of guide elements carried by one of said members and arranged in opposite relation in axial alignment along a second axis orthogonal to the first axis; and
   the other of said members having an annular groove of a predetermined cross section provided in a surface of said other member;
   the guide elements carried by one member extending into the annular groove of the said other member for permitting rotation of the second member about the first axis and angular movement of the second member about the second axis while restraining motion of the rotatable second member about a third axis perpendicular to the first and second axes.

2. The improvement defined by claim 1 in which:
   each guide element comprises a ball,
   said one member has concave hemispherical sockets for receiving the balls and maintaining the balls in position along the second axis and in the annular groove provided in the surface of the other member, and
   said annular groove in the other member is trapezoidal in cross section.

3. The improvement defined by claim 1 wherein the guide elements include:
   rigid cylindrical torque arms fixedly attached to said one member and extending from said one member in opposite relation along the second axis into the annular groove provided in the surface of the other member.

4. The improvement defined by claim 3 including:
   fluid pressure conduits from the fluid pressure chamber of the one member to the cylindrical surfaces of the torque arms for transmission of a fluid medium under pressure thereto so as to provide a fluid pressure bearing between surfaces of the torque arms and surfaces of the annular groove in the other member during rotation of the second member.

5. The improvement defined by claim 1 wherein the first member includes:
   a spherical bearing having a fluid pressure chamber therein and at least one support fixedly attached to the platform;
   concave diametrically opposed sockets in the bearing along said second axis; and
   fluid pressure condits extending from the fluid pressure chamber within the bearing and opening into the surfaces of the sockets,
   the second member includes:
       a rotor having the annular groove of predetermined cross section about the internal surface of the rotor; and
   the guide elements include:
       torque balls in the sockets and annular groove so as to be freely rotatable in the sockets and groove upon rotation of the rotor about said first axis;
   the fluid pressure conduits opening into the surfaces of sockets for transmission of a fluid medium under pressure thereto so as to provide a fluid pressure bearing between the torque balls and the concave surfaces of the sockets positioning the torque balls under pressure of the fluid medium into the annular groove during rotation of the rotor; and
   the torque balls permitting motion of the rotor about a second axis perpendicular to said first axis and restraining motion of the rotor about a third axis perpendicular to said first and second axes.

6. The improvement defined by claim 5 wherein said annular groove in the rotor being trapezoidal in cross section and formed in an internal surface of said rotor,
   the fluid pressure conduits opening into the concave surfaces of the sockets providing a fluid pressure medium positioning the torque balls under pressure of the fluid medium into contacting relation with opposing sides of the annular groove of trapezoidal cross section so as to define thereby a space between the torque balls and a third side of the annular groove during rotation of the rotor.

7. The improvement defined by claim 1 wherein:
   the guide elements include rigid cylindrical torque arms fixedly attached to said bearing and extending from said bearing in opposite relation along the second axis and into the annular groove provided in the surface of the other member and having fluid pressure conduits extending to the torque arm surfaces for transmission of fluid medium under pressure thereto so as to provide a fluid pressure bearing between surfaces of the torque arms and surfaces of the annular groove in the second member during rotation of the second member.

8. The improvement defined by claim 1 wherein:
   the first member includes:
       a bearing having a fluid pressure chamber therein and at least one support fixedly attached to the platform;
       concave diametrically opposed sockets in an internal surface of the bearing and along said second axis; and
       fluid conduits extending from the fluid pressure chamber within the bearing and opening into the surfaces of the sockets;
   the second member includes:
       a spherical rotor positioned within the bearing and having said annular groove of predetermined cross section provided in an external surface thereof; and
   the guide elements include:
       torque balls in the sockets and groove,
   the fluid pressure conduits opening into the surfaces of the sockets for transmission of a fluid medium under pressure thereto so as to provide a fluid pressure bearing between the torque balls and the concave surfaces of the sockets, positioning the torque balls under pressure of the fluid medium into the annular groove during rotation of the rotor; and the torque balls permitting motion of the rotor about a second axis perpendicular to said first axis and restraining motion of the rotor about a third axis perpendicular to said first and second axes.

9. The improvements defined by claim 1 wherein the first member includes:

a bearing having a fluid pressure chamber therein and at least one support for attaching the bearing to the platform;

other fluid pressure conduits extending from the fluid pressure chamber within the bearing and opening to a space adjacent the guide elements to provide a fluid pressure medium intermediate the guide elements and one of said members, and the guide elements being carried by the bearing and arranged in opposite relation in axial alignment along said second axis orthogonal to the first axis, the second member includes:

a rotor having an annular groove of predetermined cross section in a surface of the rotor, and the guide elements extending into the annular groove in the surface of the rotor for permitting rotation of the rotor about the first axis and angular movement of the rotor about the second axis while restraining motion of the rotor about said third axis perpendicular to the first and second axes.

10. A single degree of freedom gyroscope comprising:

two members with opposing spherical portions forming a fluid pressure bearing, one member being fixedly mounted and the other member being rotatable relative thereto about a first axis, means for providing pressure to the fluid pressure bearing, a pair of torque elements carried by the fixed member and aligned along a second axis orthogonal to the first axis, and the rotating member having an annular groove receiving the torque elements so that the rotating member rotates about the first axis and moves angularly about the second axis but is restrained against movement about a third axis mutually perpendicular to the first and second axes.

11. The gyroscope defined by claim 10 in which:

each torque element comprises a ball; and said fixed member has concave hemispherical sockets for receiving the balls and maintaining the balls in position along the second axis and in the annular groove in the rotating member.

12. A gyroscope as defined in claim 11 including means for providing fluid pressure to the hemispherical sockets to provide a fluid pressure bearing for the torque balls.

13. A gyroscope as defined in claim 12 in which the annular groove in the rotating member is trapezoidal in cross section.

14. A gyroscope as defined in claim 10 including means for providing fluid pressure between the torque elements and one of the members to provide a fluid pressure bearing therebetween.

References Cited

UNITED STATES PATENTS

| | | | |
|---|---|---|---|
| 2,091,964 | 9/1937 | Carter | 74—5.43 |
| 2,124,871 | 7/1938 | Fieux | 74—5.7 |
| 2,688,805 | 9/1954 | Annen | 74—5.7 XR |
| 3,257,854 | 6/1966 | Schneider et al. | 74—5.7 |

FOREIGN PATENTS

| | | |
|---|---|---|
| 438,382 | 8/1948 | Italy. |
| 1,357,815 | 3/1964 | France. |

MILTON KAUFMAN, Primary Examiner

MANUEL ANTONAKAS, Assistant Examiner

U.S. Cl. X.R.

74—5.7; 308—9